(12) United States Patent
Myers et al.

(10) Patent No.: US 7,802,259 B2
(45) Date of Patent: Sep. 21, 2010

(54) SYSTEM AND METHOD FOR WIRELESS BROADBAND CONTEXT SWITCHING

(75) Inventors: Theodore Jon Myers, San Diego, CA (US); Robert W. Boesel, San Diego, CA (US); Daniel Thomas Werner, San Diego, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 1375 days.

(21) Appl. No.: 11/199,564

(22) Filed: Aug. 8, 2005

(65) Prior Publication Data

US 2007/0033593 A1    Feb. 8, 2007

(51) Int. Cl.
G06F 9/46 (2006.01)
G06F 9/00 (2006.01)
G06F 1/00 (2006.01)

(52) U.S. Cl. .................. 718/108; 718/102; 718/103; 712/228; 713/323

(58) Field of Classification Search .......... 718/100, 718/102, 104, 108, 103; 713/323; 712/228
See application file for complete search history.

(56) References Cited

U.S. PATENT DOCUMENTS

| | | | |
|---|---|---|---|
| 4,096,567 A | 6/1978 | Millard et al. | |
| 4,500,954 A | 2/1985 | Duke et al. | |
| 4,541,048 A | 9/1985 | Propster et al. | |
| 4,602,350 A | 7/1986 | Gray | |
| 5,059,892 A | 10/1991 | Stoft | |
| 5,200,925 A | 4/1993 | Morooka | |
| 5,220,668 A | 6/1993 | Bullis | |
| 5,293,623 A | 3/1994 | Froniewski et al. | |
| 5,329,678 A | 7/1994 | Bagnasco | |
| 5,483,640 A | 1/1996 | Isfeld et al. | |
| 5,884,055 A | 3/1999 | Tung et al. | |
| 5,986,715 A | 11/1999 | Ikeyama et al. | |
| 5,991,265 A | 11/1999 | Lincoln | |
| 6,188,723 B1 | 2/2001 | Lee et al. | |
| 6,192,408 B1 | 2/2001 | Vahalia et al. | |
| 6,260,150 B1 * | 7/2001 | Diepstraten et al. | 713/323 |
| 6,397,273 B2 | 5/2002 | Chilton | |
| 6,411,982 B2 * | 6/2002 | Williams | 718/102 |
| 6,438,667 B1 | 8/2002 | Shinozaki | |
| 6,442,580 B1 | 8/2002 | Machida | |
| 6,467,053 B1 | 10/2002 | Connolly et al. | |

(Continued)

OTHER PUBLICATIONS

Stokes, "Understanding bandwidth and latency." Nov. 2002, ARS Technica, p. 1-5.

(Continued)

*Primary Examiner*—Meng-Ai An
*Assistant Examiner*—Tammy Lee

(57) ABSTRACT

A method for switching between instruction contexts within a time interval in a multi-mode wireless broadband processing system. The method can include executing critical task operations that complete execution within a time interval, a critical task including a plurality of critical task operations, executing non-critical task operations that are able to cross a time interval boundary, a non-critical task including a plurality of non-critical task operations, and entering a sleep mode in which no critical task operations or non-critical task operations are executed, if the critical task operations and the non-critical task operations begun in the time interval have been completed before a following time interval begins.

14 Claims, 15 Drawing Sheets

U.S. PATENT DOCUMENTS

| | | | |
|---|---|---|---|
| 6,473,839 B1 | 10/2002 | Kremser et al. | |
| 6,785,892 B1 | 8/2004 | Miller et al. | |
| 6,810,308 B2 | 10/2004 | Shajii et al. | |
| 6,880,070 B2 | 4/2005 | Gentieu et al. | |
| 6,920,632 B2* | 7/2005 | Donovan et al. | 718/103 |
| 7,184,450 B1* | 2/2007 | Wolf et al. | 370/535 |
| 7,233,968 B2 | 6/2007 | Kang | |
| 7,246,220 B1* | 7/2007 | Cheng et al. | 712/228 |
| 7,319,702 B2 | 1/2008 | Moll et al. | |
| 7,395,293 B1 | 7/2008 | Szedo et al. | |
| 7,457,726 B2 | 11/2008 | Nguyen et al. | |
| 7,519,793 B2 | 4/2009 | Abdelilah et al. | |
| 2001/0042090 A1* | 11/2001 | Williams | 709/102 |
| 2002/0023115 A1 | 2/2002 | Kanasugi et al. | |
| 2002/0116595 A1 | 8/2002 | Morton | |
| 2004/0071104 A1* | 4/2004 | Boesel et al. | 370/320 |
| 2004/0172631 A1* | 9/2004 | Howard | 718/100 |
| 2004/0210797 A1 | 10/2004 | Kimelman et al. | |
| 2005/0044457 A1 | 2/2005 | Jeddeloh | |
| 2005/0060705 A1* | 3/2005 | Katti et al. | 718/100 |
| 2005/0119025 A1* | 6/2005 | Mohindra et al. | 455/552.1 |
| 2006/0010263 A1 | 1/2006 | Kim | |
| 2006/0063520 A1 | 3/2006 | Fratti et al. | |
| 2006/0206898 A1* | 9/2006 | Miner et al. | 718/104 |
| 2007/0008984 A1 | 1/2007 | Philips et al. | |
| 2007/0030801 A1 | 2/2007 | Werner et al. | |
| 2007/0033244 A1 | 2/2007 | Cohen et al. | |
| 2007/0033245 A1 | 2/2007 | Myers et al. | |
| 2007/0033349 A1 | 2/2007 | Myers et al. | |
| 2007/0033593 A1 | 2/2007 | Myers et al. | |

OTHER PUBLICATIONS

International Search Report from PCT Application PCT/US2005/032177.
Actions on the Merits by the USPTO as of Apr. 13, 2009, 2 pages.
U.S. Appl. No. 11/199,560, Final Office Action mailed Jun. 1, 2009.
U.S. Appl. No. 11/199,372, Office Action mailed Jun. 10, 2009.
U.S. Appl. No. 11/199,577, Office Action mailed Jun. 29, 2009.

* cited by examiner

SYSTEM AND METHOD FOR WIRELESS BROADBAND CONTEXT SWITCHING

CROSS REFERENCE TO RELATED APPLICATIONS

This application is related to U.S. patent application Ser. No. 11/199,562, filed Aug. 8, 2005, entitled SYSTEM AND METHOD FOR SELECTIVELY OBTAINING PROCESSOR DIAGNOSTIC DATA, U.S. patent application Ser. No. 11/199,560, filed Aug. 8, 2005, entitled CONTROLLING INPUT AND OUTPUT IN A MULTI-MODE WIRELESS PROCESSING SYSTEM, U.S. patent application Ser. No. 11/199,567, filed Aug. 8, 2005, entitled DYNAMICALLY CONTROLLING RATE CONNECTIONS TO SAMPLE BUFFERS IN A MULTI-MODE WIRELESS PROCESSING SYSTEM, U.S. patent application Ser. No. 11/199,372, Filed Aug. 8, 2005, entitled MULTI-MODE WIRELESS PROCESSOR INTERFACE, U.S. patent application Ser. No. 11/199,577, filed Aug. 8, 2005, entitled FAST FOURIER TRANSFORM (FFT) ARCHITECTURE IN A MULTI-MODE WIRELESS PROCESSING SYSTEM, and U.S. patent application Ser. No. 11/199,576, filed Aug. 8, 2005, entitled RE-SAMPLING METHODOLOGY FOR WIRELESS BROADBAND SYSTEM, all of which are assigned to the same assignee as the subject patent application.

BACKGROUND OF THE INVENTION

1. Field of the Invention

The present invention is related to communication systems and methods. More particularly, the present invention relates to switching between instructions based upon instruction context.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Wireless devices continue to need the capability to handle increasingly high data rates. To accommodate multimedia content, for example, data rates for wireless devices may need to match broadband rates for hard-wired devices. Wireless device users increasingly demand multifunction, multi-technology devices to obtain different types of content and services via multiple wireless networking technologies.

Many attempts have been made to build broadband capability into small, handheld devices. For example, wireless data technology commonly known as Wi-Fi 802.11 provides high-speed capability to handle such demanding applications as high quality (high definition) streaming video and image content. However, conventional 802.11 implementations fail to meet user-acceptable power consumption parameters. Even the lowest power-consuming 802.11 implementations currently available severely limit "talk time" (active state during which voice, data, or video is being transferred) for battery operated devices.

Beyond devising an 802.11 implementation with acceptable power consumption, another challenge is to establish a wireless implementation that supports two or more networking modes of operation, such as 802.11, Bluetooth, Ultra Wideband (UWB), WiMax (802.16d and 802.16e), 802.20, and 3G and 4G cellular systems. Wireless devices need to be able to offer a variety of wireless networking technologies. The ability to operate according to multiple networking standards and technologies in a single device is referred to as "multi-mode" capability.

Most conventional mobile devices are either digital signal processor (DSP)-based, application specific integrated circuit (ASIC)-based, or an ASIC/DSP hybrid architecture. Several engineering considerations, such as power efficiency, design flexibility and cost, prevent either approach from being suitable for broadband wireless. Because of architectural limitations, conventional approaches may be able to provide high data rates, but only at the expense of power consumption, resulting in an unacceptably short battery life.

With new wireless standards being introduced everyday, traditional ASIC design is too inflexible to continually accommodate these rapidly evolving standards. Once the integrated circuit design cycle begins for a new standard, modifications that inevitably occur necessitate re-starting from scratch or re-spinning the ASIC chip. To provide the multiple wireless capabilities end users demand on a single device, ASIC and DSP approaches support multi-mode capability by simply stacking additional "processing circuitry" in parallel, significantly increasing device volume and manufacturer costs for each new mode.

There is a need for a communication system and architecture that provides for multi-mode communication with broadband performance and low power consumption. There is also a need for the ability to prioritize the execution of tasks and their component operations based upon the context of the tasks. Further, there is a need to provide wireless communication devices that can function across multiple networks and multiple communication standards. Even further, there is a need to reduce baseband circuitry and improve ASIC algorithms to achieve ultra low power/cost advantage, resulting in performance processing gains and reductions in power consumption, gate count and silicon cost.

SUMMARY OF THE INVENTION

One exemplary embodiment relates to a method of switching between instruction contexts within a time interval. The method can include executing critical task operations that complete execution within a time interval, a critical task including a plurality of critical task operations, executing non-critical task operations that are able to cross a time interval boundary, a non-critical task including a plurality of non-critical task operations, and entering a sleep mode in which no critical task operations or non-critical task operations are executed, if the critical task operations and the non-critical task operations begun in the time interval have been completed before a following time interval begins.

Other exemplary embodiments are also contemplated, as described herein and set out more precisely in the appended claims.

DETAILED DESCRIPTION OF EXEMPLARY EMBODIMENTS

Figure 1:
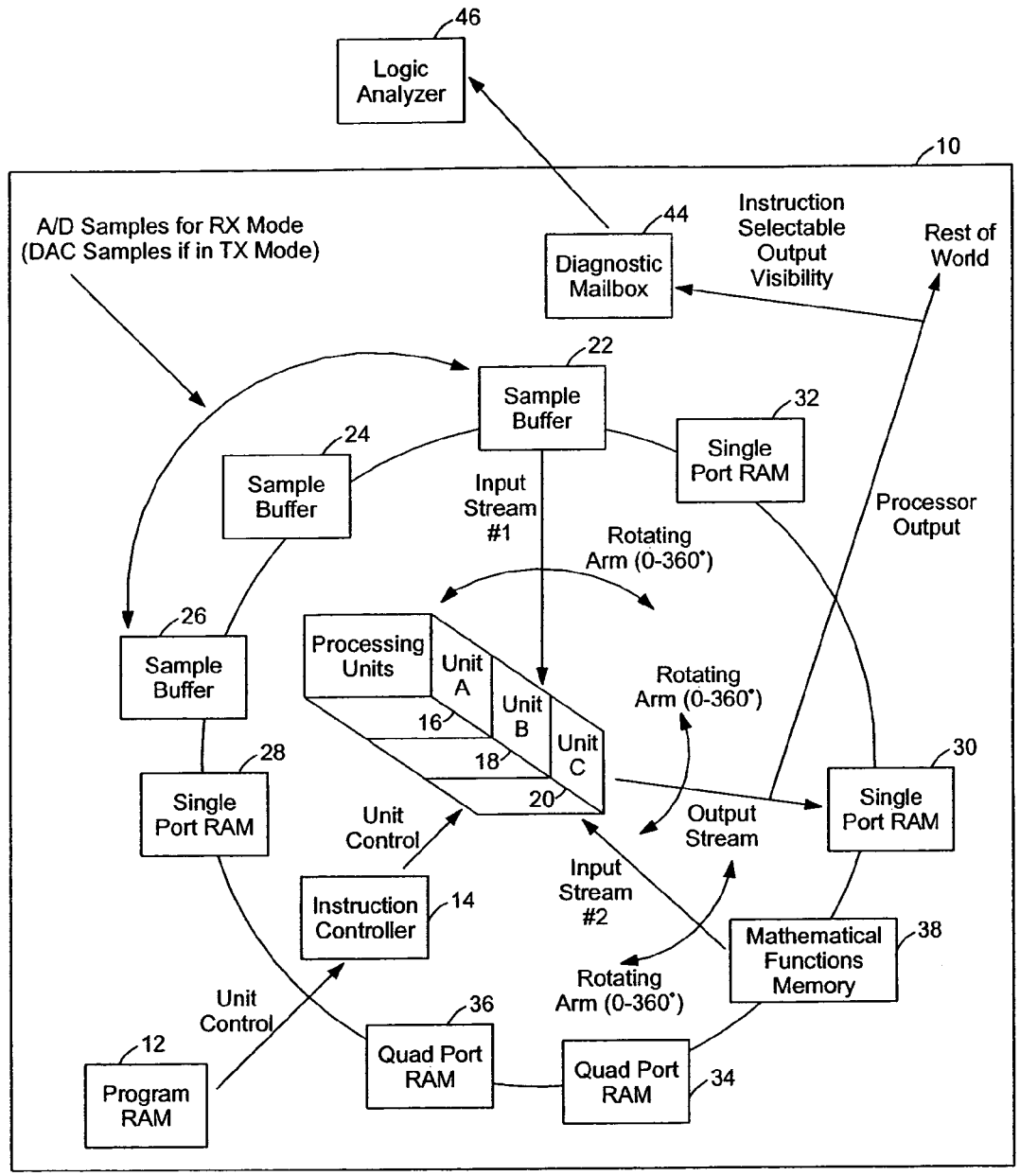
FIG. 1 is a diagram depicting a wireless broadband signal processing system in accordance with an exemplary embodiment.

FIG. 1 illustrates a wireless broadband signal processing system 10. The wireless broadband signal processing system 10 can include a program memory 12, an instruction controller 14, and processing units 16, 18, and 20. The system 10 can also include sample buffers 22, 24, and 26; single port memories 28, 30, and 32; and quad port memories 34 and 36. The program memory 12 stores programmed instructions used by the instruction controller 14. The processing units 16, 18, and 20 are configured to perform vector processes, such as demodulation processes. For example, the processing unit 16 can be configured for a convolution operation calculated each clock, the processing unit 18 can be configured for FFT functionality where a Radix-4 butterfly is performed each clock, and the processing unit 20 can be configured for other vector operations, such as de-spreading, vector addition, vector subtraction, dot product, and component-by-component multiplication. Additional, fewer, or different processing units can be included. In at least one exemplary embodiment, a memory 38 is included to provide mathematical functions to the processing units 16, 18, and 20. The memory 38 can be a read only memory (ROM).

The instruction controller 14 receives vector instructions from the program memory 12. Based on the received vector instruction, the instruction controller 14 can select port memories for input and output. Exemplary operations of the wireless broadband signal processing system 10 are described in U.S. patent application Ser. No. 10/613,476 entitled "Multi-Mode Method and Apparatus for Performing Digital Modulation and Demodulation" which is herein incorporated by reference in its entirety.

The wireless broadband signal processing system 10 further includes a diagnostic mailbox 44. The diagnostic mailbox 44 is a memory, such as a random access memory (RAM), coupled to the output of the processing units (as shown) or the input of the wireless broadband signal processing system 10. In either implementation, the diagnostic mailbox 44 receives communication data at a high frequency and transmits the communication data at a lower frequency to a logic analyzer 46 which creates a log of the contents of the diagnostic mailbox 44. The contents of the diagnostic mailbox 44 can then be reviewed and studied for an understanding of the operations of the wireless broadband signal processing system 10, performing debug operations or failure analysis, etc.

Figure 2:
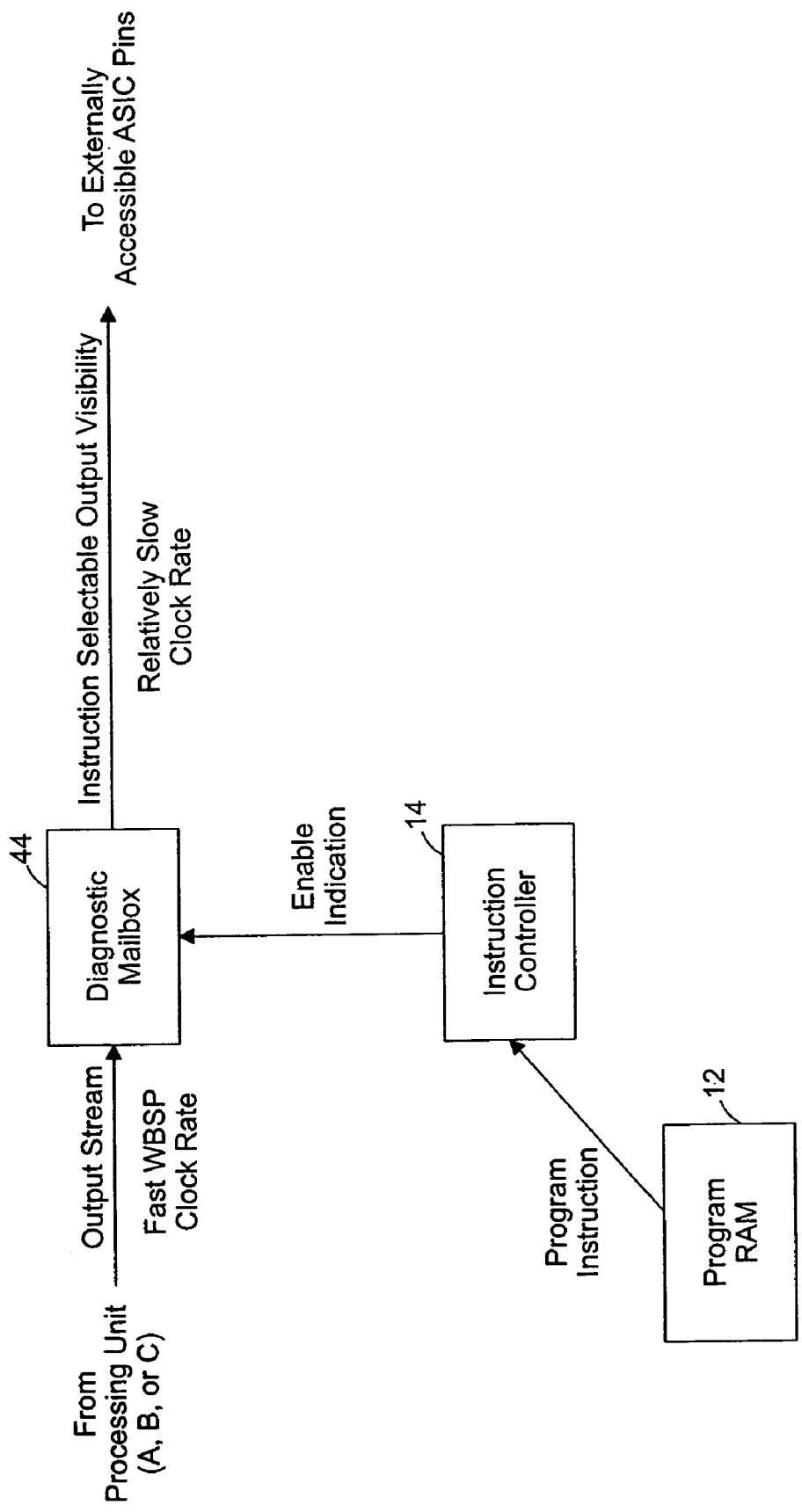
FIG. 2 is a diagram depicting use of a diagnostic mailbox in the wireless broadband signal processing system of FIG. 1 in accordance with an exemplary embodiment.

FIG. 2 illustrates the use of the diagnostic mailbox 44 according to an exemplary embodiment. In operation, the instruction controller 14 receives an instruction from the program memory 12. The instruction contains diagnostic mailbox fields with information on the type of instruction being communicated. The diagnostic mailbox field is set to a logical one (1) if the output stream is to be written to the diagnostic mailbox 44. The instruction controller 14 performs the necessary time alignment such that the diagnostic mailbox 44 is enabled for write access for the duration of the vector instruction output. The rate at which the write to the diagnostic mailbox 44 occurs is $F_{wbsp}$. The read operation from the diagnostic mailbox 44 occurs at a lower synchronous rate of $F_{read}$ which is a rate supportable for off-chip access. In an exemplary embodiment, the synchronous rate of $F_{read}$ is 40 MHz or less and is a factor of 5-10 lower than $F_{wbsp}$, which is 40 MHz or more. $F_{read} \geq NF^{wbsp}$ where N is the fraction of clocks which are associated with instructions whose diagnostic mailbox field is set to 1.

In an alternative embodiment, the instruction controller 14 enables write access to the diagnostic memory whenever the vector instruction received from the program memory 12 changes. This allows for the diagnostic mailbox 44 to provide a continual log of the output stream.

Figure 3:
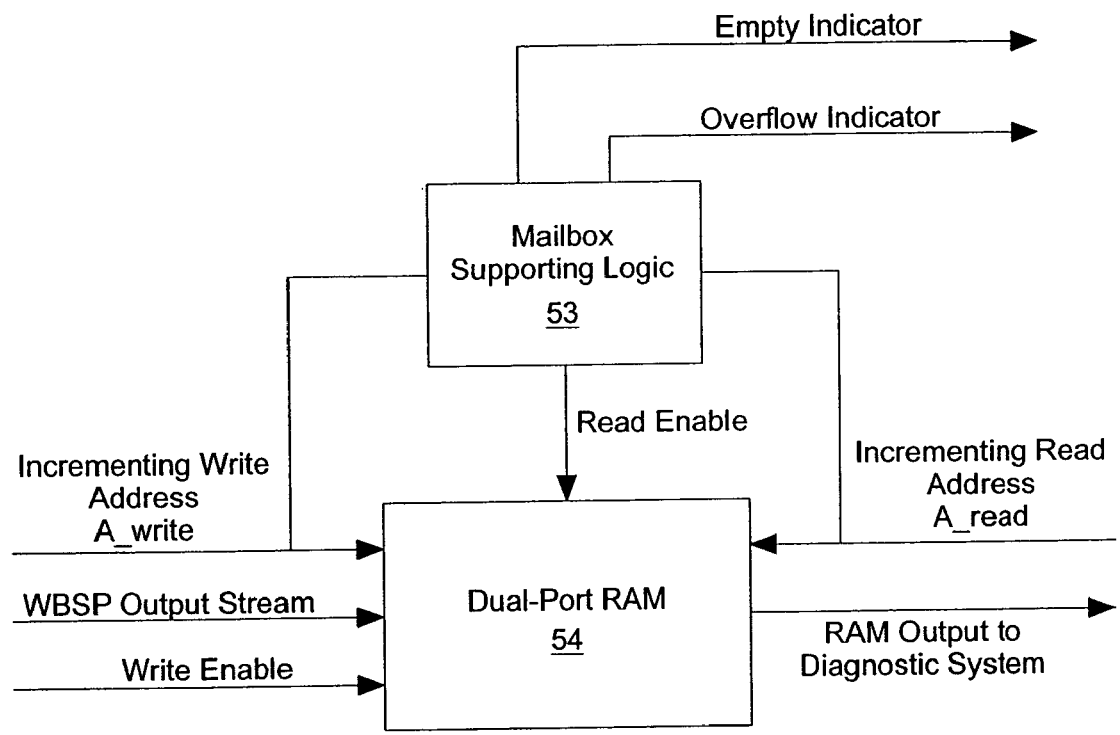
FIG. 3 is a diagram depicting a mailbox diagnostic functionality implemented via a dual-port RAM in accordance with an exemplary embodiment.

FIG. 3 illustrates a preferred embodiment in which the diagnostic mailbox is implemented via a dual-port RAM 54. Logic external to the dual port RAM 54 (not shown) increments the read and write addresses sequentially after each access—with the exception that a wrap to 0 occurs when the address value exceeds the physical size of the RAM (e.g. The address sequence would be N−3, N−2, N−1, 0, 1, 2, . . . where N is the number of accessible locations in the dual-port RAM 54). The dual port RAM 54 thus acts as a FIFO.

The write port of the dual port RAM 54 is enabled when the output of an instruction associated with a diagnostic-enabled instruction is generated. The read port of the dual port RAM 54 operates at a lower frequency than the write port. When A_write, the write address, is greater than A_read, the read address, the dual-port has valid information which is clocked out of the read port until A_write=A_read. If A_write becomes too large such that information is written over which has not been clocked out of the read port, an overflow indicator is set and latched which indicates an error condition.

In an exemplary embodiment, mailbox supporting logic 53 includes instructions that aid the dual-port RAM 54 in carrying out its operations. The mailbox supporting logic 53 receives write addresses and read addresses. Depending on this information, the mailbox supporting logic 53 can communicate an overflow indicator, which, as explained above, indicates that information is being written over in the dual-port RAM 54 (the diagnostic mailbox 44 is full). An empty indicator can be communicated to indicate that the dual-port RAM 54 is ready to receive data (the diagnostic mailbox 44 is empty). The mailbox supporting logic 53 communicates a read enable signal to the dual-port RAM 54 when the RAM data is to be communicated out via a diagnostic stream to the logic analyzer 46.

Figure 4:
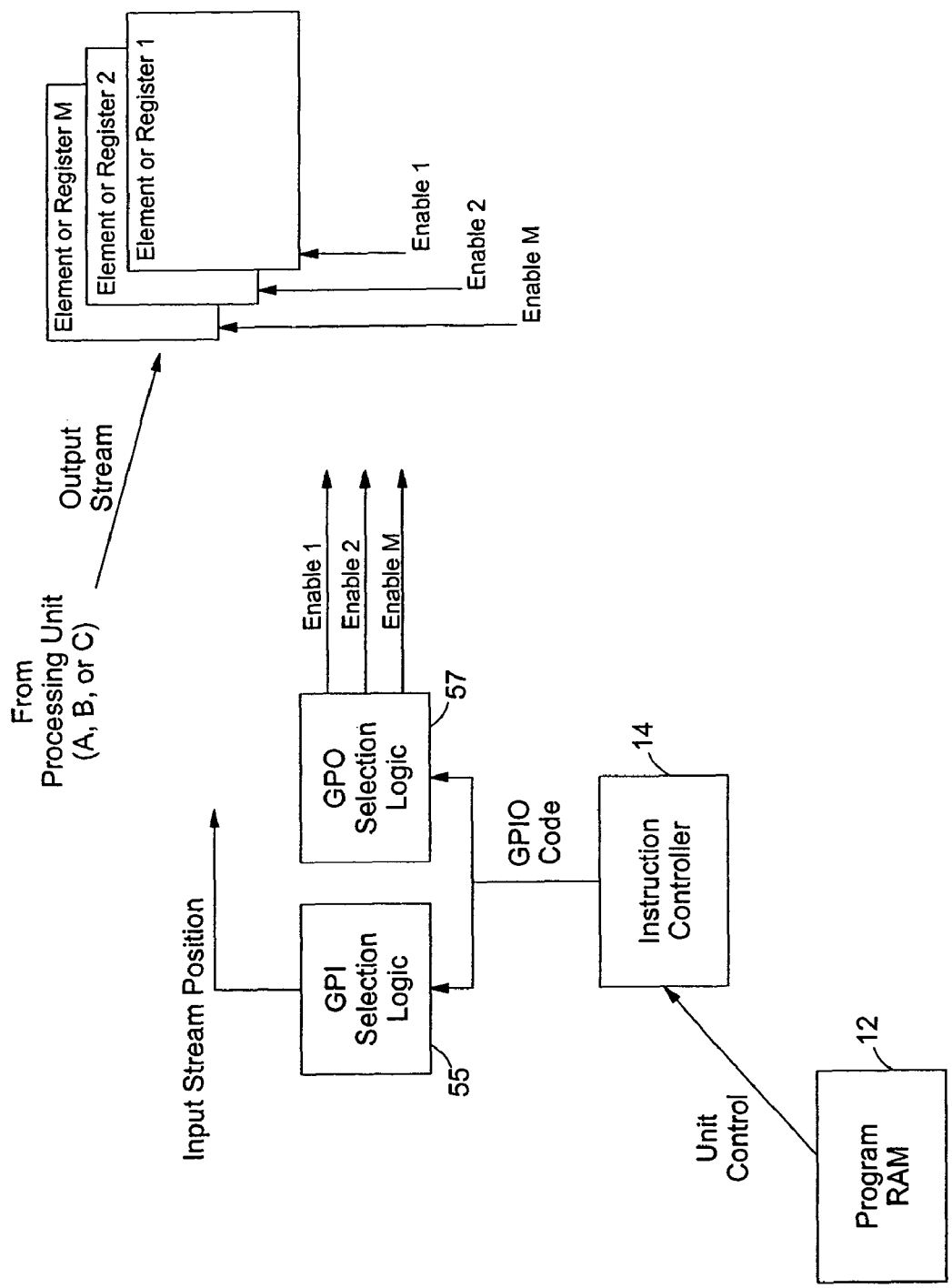
FIG. 4 is a diagram of the processing by the wireless broadband signal processing system of FIG. 1 of an instruc

FIG. 4 illustrates the processing by the instruction controller 14 of an instruction received from the program memory 12 including a general purpose input output (GPIO) instruction field. A GPIO instruction field having N bits can indicate a GPI (General Purpose Input), GPO (General Purpose Output), or neither with a GPIO code of zero. An N-bit field can address up to a combination of $2^N-1$ GPIs and GPOs. The GPIO code can trigger the instruction controller 14 to use GPI selection logic 55 or GPO selection logic 57.

A general purpose output (GPO) operation can be used to control communications to elements external to a wireless broadband signal processor (WBSP) utilized in the wireless broadband signal processing system 10. Examples of external elements include processors (such as the processor known as an ARM processor from ARM, Limited of Cambridge, England,) or RF transceivers. Additionally, registers associated with operation of the WBSP can be accessed using GPO operations, such as the PID register discussed below. When the GPIO code that is unique to an element is in the current instruction in program memory 12, the GPO selection logic 57 pulses an enable that is wired directly and uniquely to the element. The significance of the particular enable may vary depending on the element. Typically, the enable signals cause the element to latch the data on the output stream. Alternatively, an enable has significance in itself and allows the output stream to be sent directly to the element without being latched.

A general purpose input (GPI) operation can be used to receive input from elements external to the WBSP or from registers associated with operation of the WBSP. Examples of input operations include supporting the interface between the WBSP and an external processor (such as an ARM), recording the rate of frame errors. If the code asserted in the GPIO field of the instruction corresponds to a GPI, then the input stream is hooked into that particular element.

Figure 5:
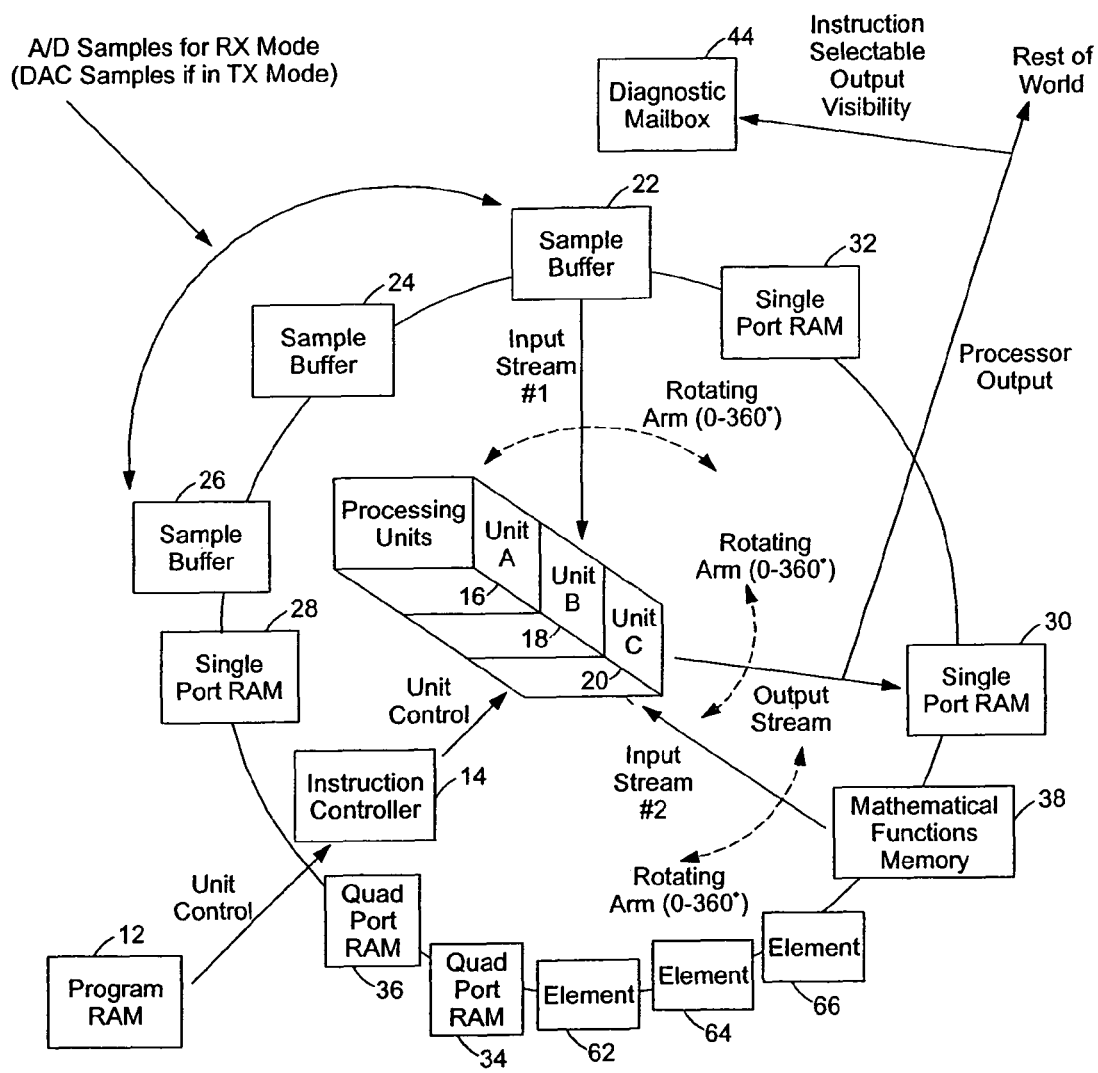
- FIG. 5 is a diagram of the wireless broadband signal processing system of FIG. 1 depicting general purpose input and output operations.

FIG. 5 illustrates the wireless broadband signal processing system 10 including the processing of an instruction having a general purpose input output (GPIO) instruction field. In one input or GPI operation, the sample buffer 22 communicates an input stream of communication data to one of the processing units 16, 18, and 20. In another input or GPI operation, an element 66 communicates an input stream of communication data to one of the processing units 16, 18, and 20.

Figure 6:
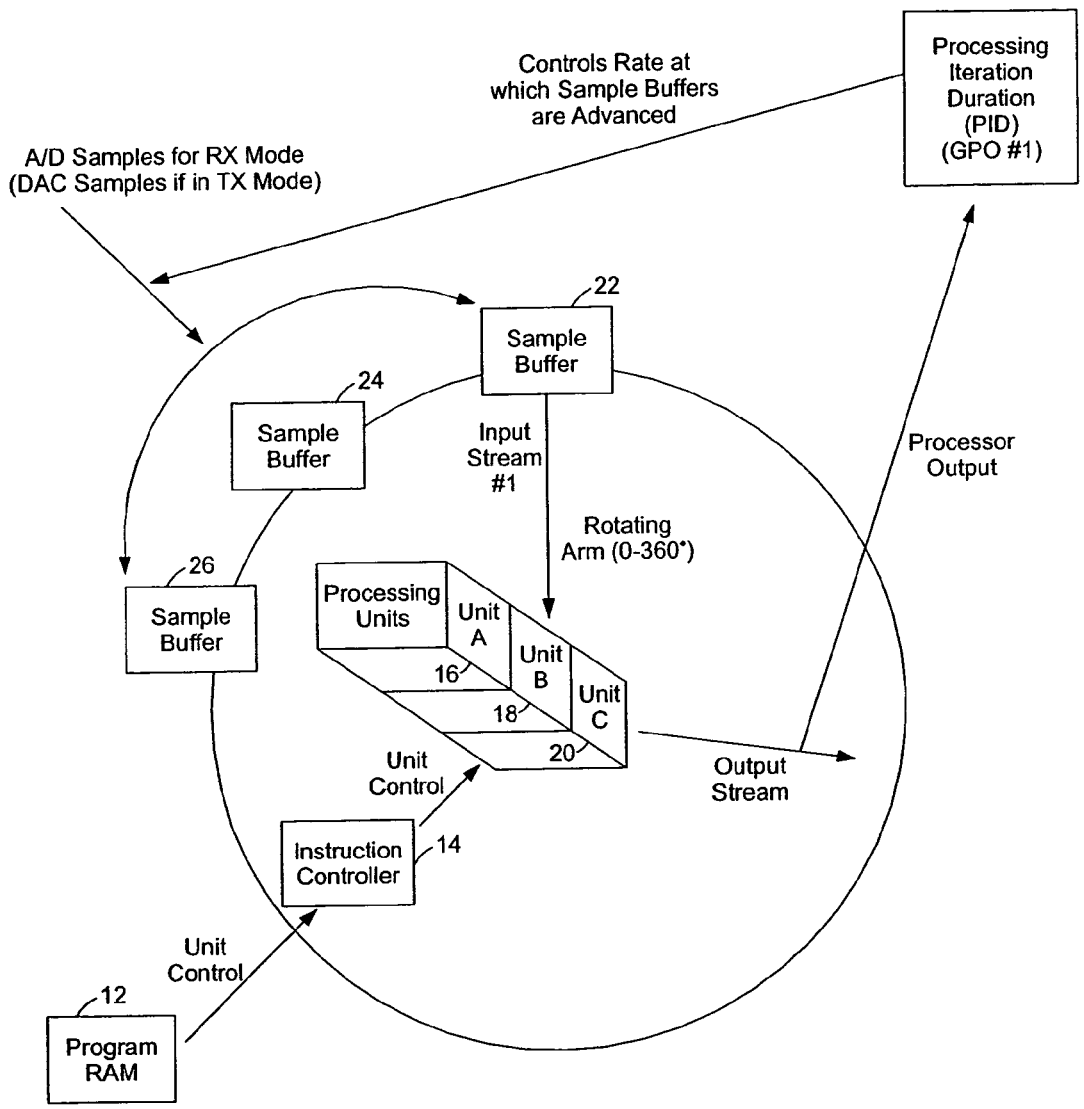
FIG. 6 is a diagram of the wireless broadband signal processing system of FIG. 1 depicting a dynamic configuration of a processing iteration duration.

FIG. 6 illustrates an exemplary dynamic configuration of a processing iteration duration (PID). The PID refers to the number of samples that are either written into the sample buffers 22, 24, and 26 in receive mode (from A/D) or read out of the sample buffers 22, 24, and 26 in transmit mode (to a DAC). Exemplary buffer techniques that can be utilized in the wireless broadband signal processing system 10 are described in U.S. patent application Ser. No. 10/613,897 entitled "Buffering Method and Apparatus for Processing Digital Communication Signals," which is herein incorporated by reference in its entirety.

The PID—the number of samples written into the sample buffers 22, 24, and 26—determines the rate at which the buffer scheme is advanced. In other terms, the PID is the program rate at which the sample buffers 22, 24, and 26 are connected to receive samples. A small PID represents a low latency situation in that the samples are available (on RX) or are made available (on TX) in a small amount of time; a larger PID allows for greater processing efficiency in that longer vector operations are allowed which is inherently more efficient (initial processing latencies for an instruction are amortized across more output data).

The parameters that determine the rate of the advance of the sample buffers 22, 24, and 26 is accessible via a GPIO instruction. When the GPIO field in the current instruction contains the value of 1, the output stream is routed to the register that controls the rate at which the sample buffers are advanced. As such, the ability of the instruction controller 14 to dynamically alter the PID allows for real-time tradeoffs between low and high latency. For example, a longer PID can be used when longer vector operations are in execution or anticipated to be executed. Additionally, some PIDs are inherently superior for standards that have a specific symbol rate (e.g., 4 microsecs is a natural fit for 802.11g).

Figure 7:
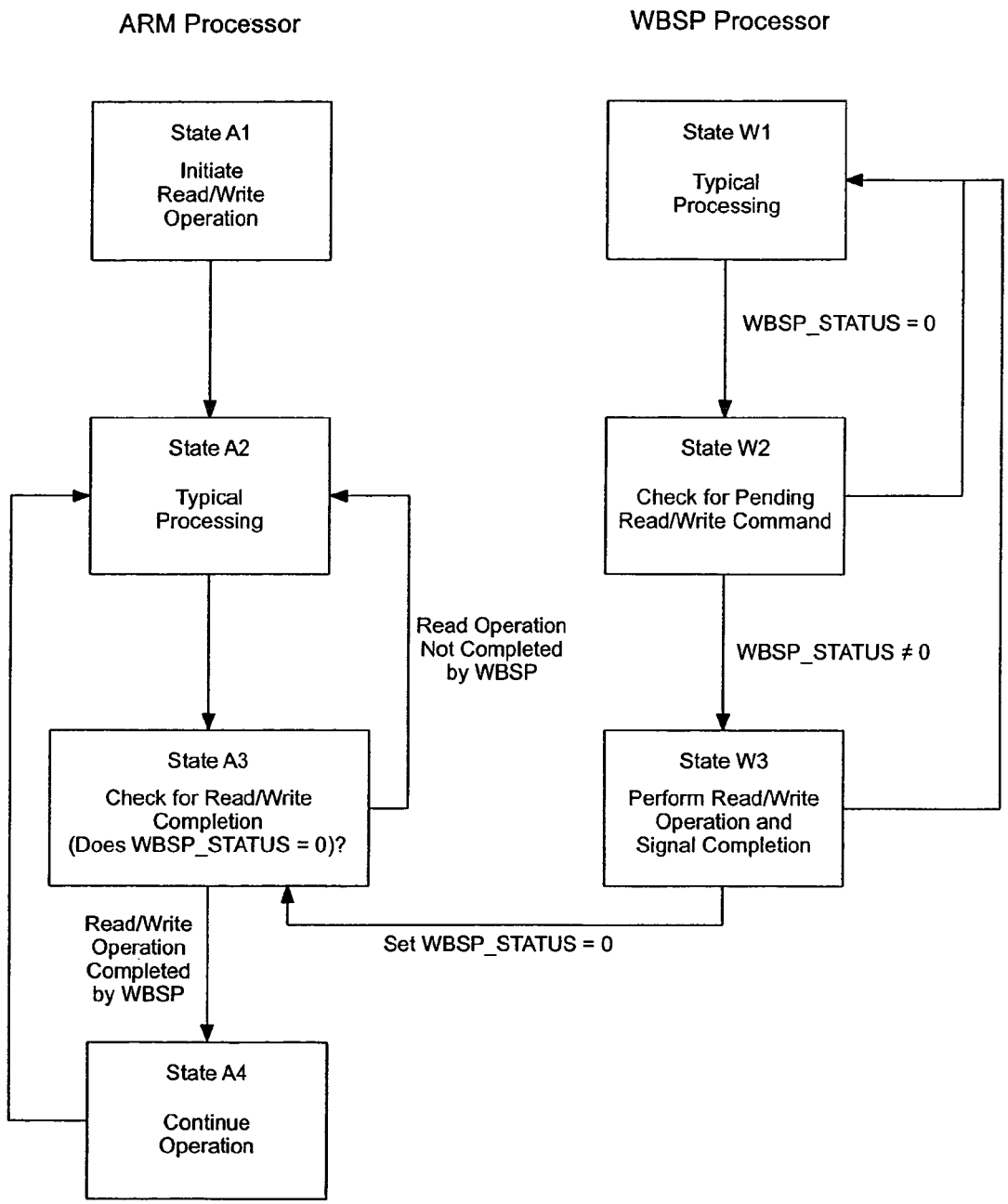
FIG. 7 is a diagram depicting operations performed by an ARM processor and a wireless broadband signal processor (WBSP) processor utilized in the wireless broadband signal processing system of FIG. 1 in accordance with an exemplary embodiment.

FIG. 7 illustrates operations performed by a processor, such as the ARM processor, and a wireless broadband signal processor utilized with the wireless broadband signal processing system 10 according to at least one exemplary embodiment. Additional, fewer, or different operations may be performed depending on the particular embodiment or implementation.

According to at least one exemplary embodiment, the WBSP is employed as a signal processor and as such, needs to be under the control of a master processor, such as an ARM processor. The ARM processor thus needs to have the ability to read and write to the WBSP. The interface illustrated in FIG. 7 is entirely software defined and as such, is highly flexible. The ARM processor and WBSP can be programmed to define an interface that supports any protocol.

A "read" request is the mechanism for communicating the contents of a specific memory location inside of a specific WBSP buffer to the ARM processor. A "write" request is the mechanism for communicating from the ARM processor to the WBSP processor a specific value that is to be placed into a specific memory location inside of a specific buffer of the WBSP processor.

The "read" request supports information that the ARM processor may access from the WBSP processor for a variety of purposes, such as calibration, PHY statistics for host GUI Display (like RSSI), and dynamic algorithm inputs to ARM processing. The "write" request supports the communication of information that the ARM passes to the WBSP, such as DC Removal (I and Q) on TX, TX Power updates as a function of data rate, operating mode of modem 802.11 a/b/g (allows less processing for power consumption when dual acquisition is not required), and RSSI calculation active (again, allowing disabling for power consumption).

In State A1, the ARM processor initiates a request for a read or write request. In general, since the processors are operating asynchronously relative to each other, the WBSP processor is in State W1 which includes some general processing. Periodically, the WBSP processor transitions to State W2 to check the WBSP_STATUS bits. These bits are accessible as a GPI instruction. If WBSP_STATUS=0, general processing resumes in State W1. If WBSP_STATUS is non-zero, then State W3 is transitioned where the ARM command is performed.

If the operation is a "read", the WBSP processor accesses the address specified in WBSP_ADDRESS. This one-dimensional address is translated into a two-dimensional WBSP address, including a buffer number and an address within the buffer. The contents of this location is accessed and the output stream is directed to the GPO associated with WBSP_DATA.

If the operation is a "write", the WBSP processor accesses the address specified in WBSP_ADDRESS. This one-dimensional address is translated into the two-dimensional WBSP address, including a buffer number and an address within the buffer. The value of WBSP_DATA is accessed via the GPI mechanism. The WBSP processor routes this value to the output stream which is destined for the decoded buffer number and address within the buffer.

In both the "read" and "write" cases, the value of WBSP_STATUS is reset to 0. Meanwhile, the ARM processor resumes its general processing in STATE A2. Periodically, the ARM processor checks the value of WBSP_STATUS via its MMIO register ARM_WBSP_ACCESS. When this value is 0, the ARM processor is aware that the "read" or "write" command has been completed. If this operation was a read, the ARM processor can access the read value in the WBSP_DATA register. Continued operation may occur (STATE A4) influenced by the "read" operation including the option of initiating another "read" or "write" command. Simultaneously, the WBSP operation may continue operation in STATE W3 influenced by the "write" operation.

Figure 8:
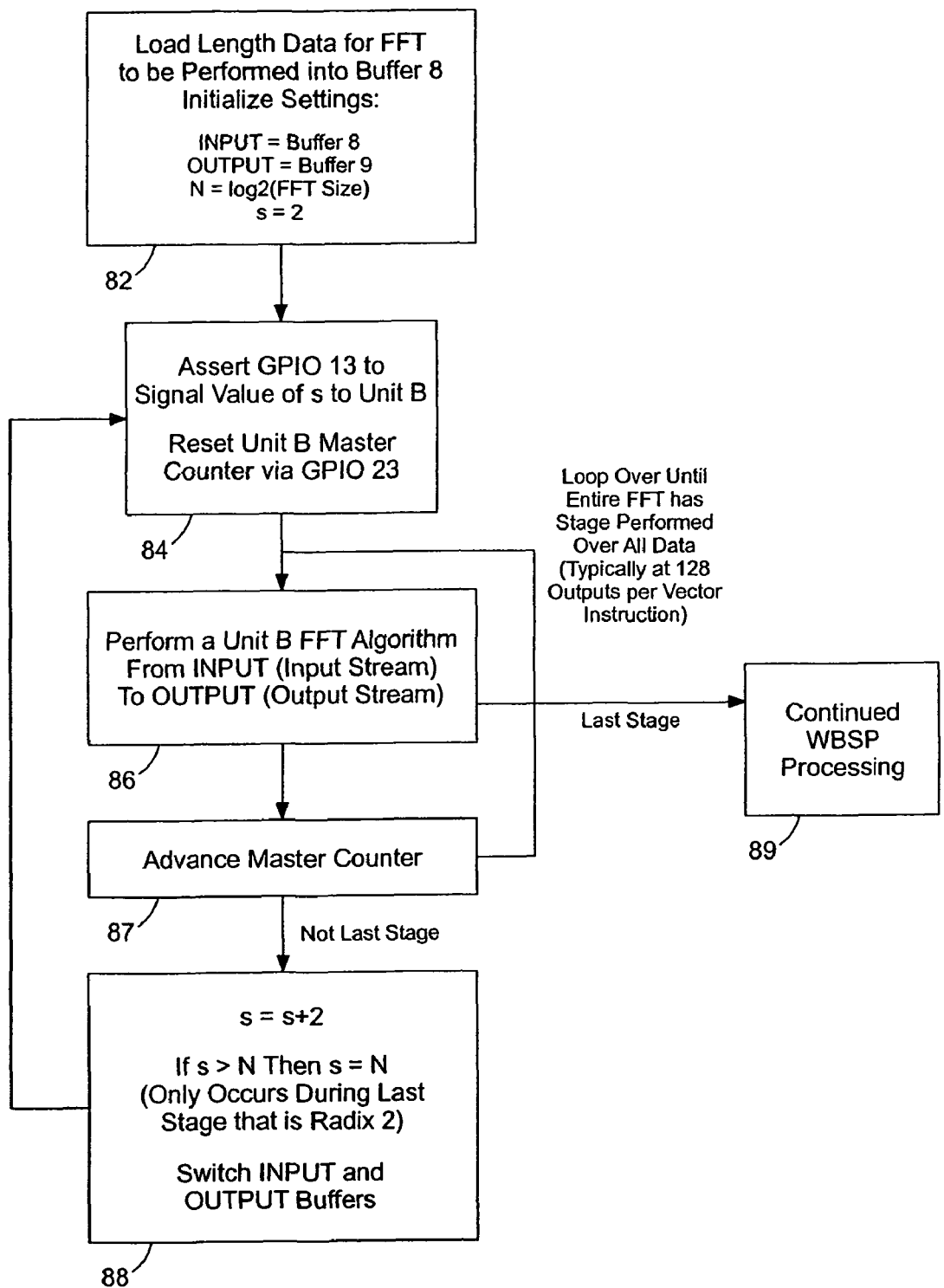
FIG. 8 is a diagram depicting FFT operations performed in the wireless broadband signal processing system of FIG. 1 in accordance with an exemplary embodiment.

FIG. 8 illustrates operations performed in an exemplary FFT algorithm performed in the wireless broadband signal processing system 10. Additional, fewer, or different operations may be performed in the algorithm depending on the particular embodiment or implementation. The FFT algorithm can be coded into a software program that resides in the program memory 12. In an operation 82, the data that is to undergo the FFT/IFFT transform is loaded into a buffer. Settings are initialized that govern the operation of subsequent operations. A second counter is initialized to two, and N is set to the $\log_2$ length of the input vector. In an operation 84, a GPIO instruction number 23 causes a reset of a master counter in processing unit 18. GPIO instruction number 13 signals the FFT length (N) to processing unit 18 (FIG. 1). The master counter is responsible for address generation as described in greater detail below.

In an operation 86, processing unit 18 performs a vector operation associated with the FFT/IFFT algorithm. In at least one embodiment, the upper limit of the length of the vector to be operated upon by the vector instruction is 128 words. For data lengths larger than 128 words, it is necessary to loop through the FFT/IFFT algorithm a sufficient number of times (e.g., if the data length is 2048 words, and the maximum vector length is 128 words, 16 iterations of the FFT/IFFT algorithm are required to perform the transform). In an operation 87, the value of the master counter is incremented only after the FFT/IFFT algorithm has operated on one 128 word segment of data (unless explicitly reset via a GPIO instruction 23) in operation 86.

In an operation 88, a second counter is advanced by two to proceed to the next stage of FFT/IFFT processing. Also, the INPUT and OUTPUT buffers are switched, enabling the cascading of processing between the FFT/IFFT stages. In an operation 89, if all the stages of the FFT/IFFT processing have been performed, then the FFT/IFFT transformed data is available for further processing by the processor.

Referring to FIG. 1, the memory 38 provides mathematical functions to the processing units 16, 18, and 20. In a preferred embodiment, the memory 38 is a read only memory (ROM). ROMs are relatively power consuming. As such, minimizing accesses to the memory 38 reduces the overall power required. In the FFT algorithm, it is necessary to access the memory 38 for mathematical functions, including Twiddle Factors used for the outputs of Radix-4 operations.

By a re-ordering of the segments of the input vector operated on by the FFT algorithm in a given stage, it is possible to use the same set of 3 Twiddle Factors for the outputs of successive Radix-4 operations. By way of example, consider a 4096-word FFT in which $\log_4(4096)=6$ stages are required. For Stage 1, the 3 Twiddle Factors are accessed from the memory 38 every Radix-4 operation. It should be noted that the first output of the Radix-4 operation has a Twiddle Factor that is always unity, thus only 3 of the outputs are non-trivial. However, for the next stage or Stage 2 of the FFT algorithm, the same set of three Twiddle Factors may be used for 4 consecutive Radix-4 operations if the optimal address generation scheme is used as described below. For Stage 3 of the FFT algorithm, the same set of three Twiddle Factors may be used for 16 consecutive Radix-4 operations. For Stage 4, that number continues to grow geometrically to 64 consecutive Radix-4 operations.

Other design considerations can reduce the required amount of Twiddle Factor space in the memory 38. For example, since larger powers of 2 are supersets of the smaller powers of 2, only the Twiddle Factors corresponding to the largest FFT size need be stored. Thus, the Twiddle address generation supports all FFT sizes collapsed into a single table. The address generation scheme also supports reduction of the number of Twiddle Factors even for the largest FFT size. For example, taking an 8192-word FFT, adjacent Twiddle Factors are a factor of exp(j*2*pi/8192) different, which is too small to resolve in the fixed point representation of 10 bits. As such, a reduced set of Twiddle Factors are stored in which all odd values are discarded. By symmetry, the full unit circle of 2*pi radians can be constructed by storage of pi/4 (one octant) worth of Twiddle Factors. The unit circle reduces the storage requirement by an additional $\frac{1}{8}^{th}$. The Twiddle address generation coupled with the Twiddle Octant Manipulation Block (shown in processing unit 18 described with respect to FIG. 9) accomplishes this storage reduction.

Figure 9:
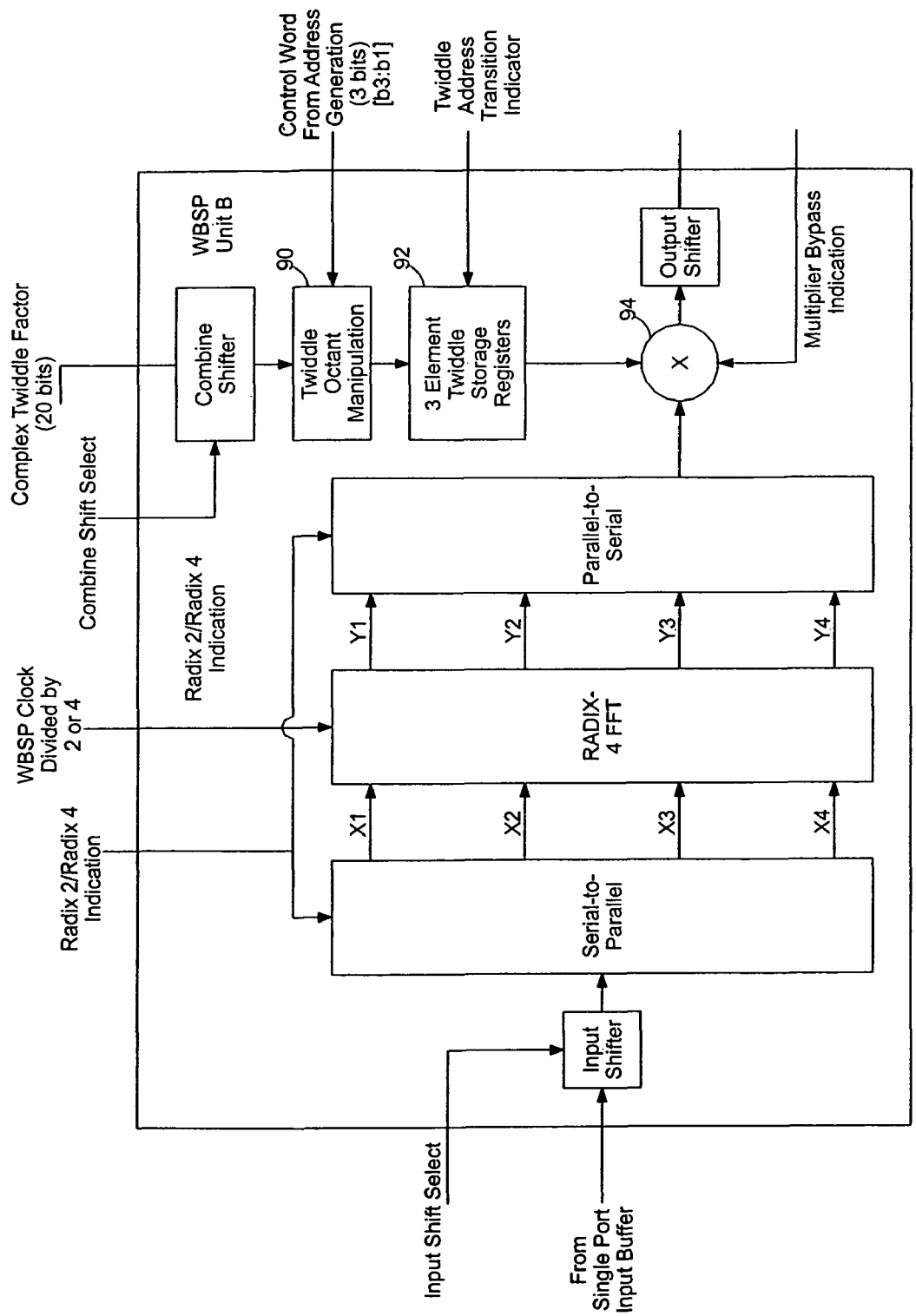
FIG. 9 is a diagram depicting functionalities of a processor performing an FFT algorithm in the wireless broadband signal processing system of FIG. 1.

FIG. 9 illustrates a more detailed view of the functionalities of the processor 18 described with reference to FIG. 1. In at least one embodiment, the processor 18 buffers four inputs (X1, X2, X3, and X4) for the ensuing Radix-4 FFT because the processor receives data serially from a single port RAM. The exception is the final Radix-2 stage on FFT sizes that are not an integral power of 4. In this case, only 2 inputs are buffered with X2 and X4 set to zero.

The Radix-4 FFT engine operates at a reduced clock rate relative to the rest of the wireless broadband signal processing system 10. In many embodiments, the Radix-4 FFT engine operates at the system clock frequency reduced by a factor of 4. The exception is the final Radix-2 stage on FFT sizes that are not an integral power of 4, in which case the system clock frequency is reduced by a factor of two. The Radix-4 FFT engine is optimized such that 8 complex additions can be performed to produce 4 outputs. The Radix-4 FFT engine includes 2 sets of cascaded adders. The first set of adders produces the following partial sums based on the 4 complex inputs:

$$P1 = X1 + X3$$

$$P2 = X1 - X3$$

$$P3 = X2 + X4$$

$$P4 = X2 - X4$$

A second set of adders computes the outputs based upon the partial sums as:

$$Y1 = P1 + P3$$

$$Y2 = P2 - j*P4$$

$Y3 = P1-P3$ $Y4 = P2+j*P4$ where multiplication by j is implemented via switching I and Q and inverting the I output.

In general, there is no truncation in this operation.

The output of each scalar Twiddle factor multiplication is truncated to 11 bits. Therefore, the output of the complex multiplier is 12 bits. Bits [10:1] are mapped to the output of the processing unit 18. To reduce the rate at which Twiddle Factors are accessed, there are 3 storage registers 92 for storing the non-unity Twiddle factors. As further described below with respect to FIGS. 10-13, the storage registers 92 only update when the Twiddle address transitions out of the Twiddle address generator mapping block. This transition is signaled to the storage registers 92 by the Twiddle Address transition indicator generated in operation 106, discussed in greater detail below. The multiplier 94 supports a bypass functionality on every 4$^{th}$ multiply when the unity Twiddle factor is to be applied. Based upon a 3-bit control word from a multiplier 110 shown in FIG. 10 and described below, the accessed Twiddle factor is manipulated by the Twiddle octant manipulator 90 as follows. The Twiddle factor is subjected to the cascaded effect of the 3 operations:

If Bit 1 xor Bit 2==1

Swap I and Q of Twiddle Factor and negate real and imaginary

If Bit 2==1

Negate Real of Twiddle Factor

If Bit 3==1

Negate Both Real and Imaginary of Twiddle Factor

Figure 10:
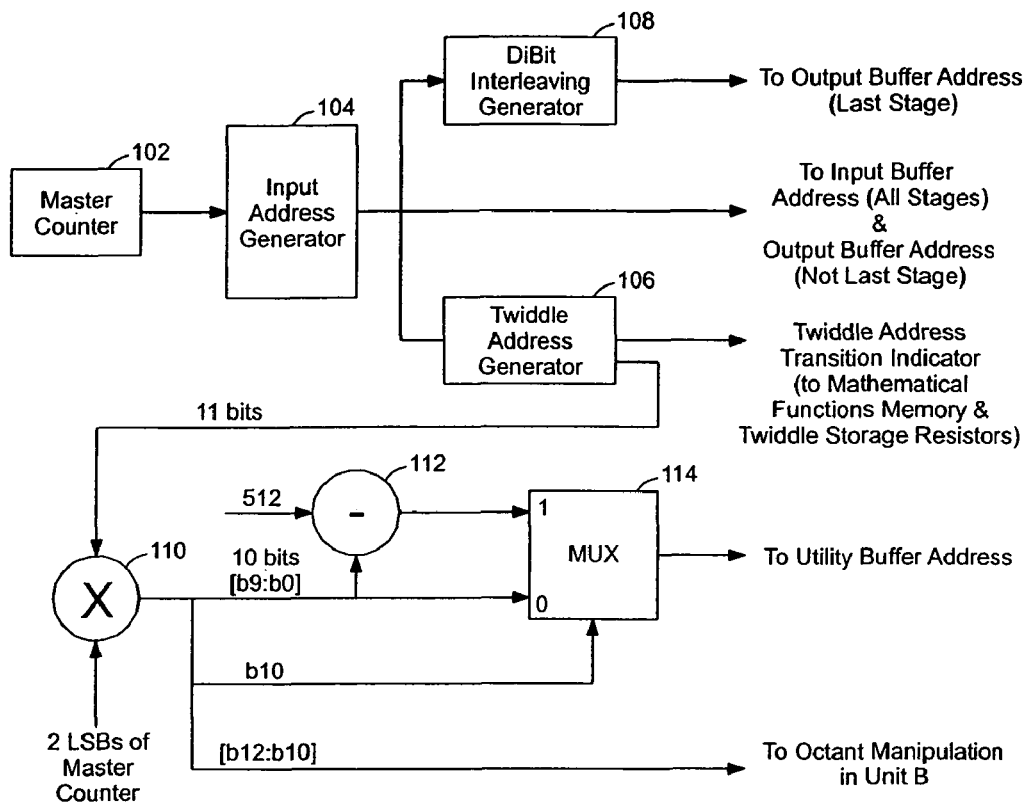
FIG. 10 is a diagram depicting operations performed in an address generation process for the FFT algorithm of FIG. 9.
Figure 11:
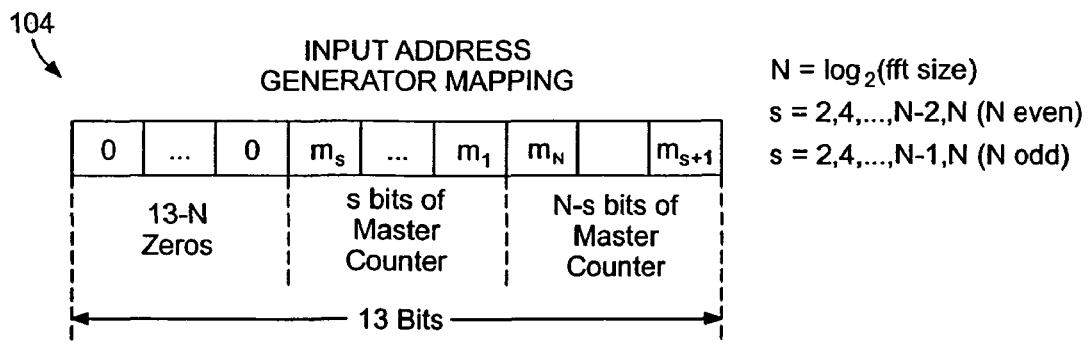
FIG. 11 is a diagram depicting an exemplary input address mapping in accordance with an exemplary embodiment.

FIG. 10 illustrates operations performed in the address generation for the FFT algorithm described with reference to FIG. 9. Additional, fewer, or different operations may be performed depending on the particular embodiment or implementation. In an operation 104, the master counter information supplied by operation 102 is mapped by an input address generator to create an input address. FIG. 11 illustrates an exemplary mapping of the master counter information. As illustrated, the input address is populated according to N, the size of the input vector being transformed by the FFT algorithm. In the exemplary mapping illustrated in FIG. 11, the input address is 13 bits long where the highest-order 13-N bits are set to zero and N=log$_2$ (FFT size), the next highest-order bits are s bits of the master counter where s=2, 4, . . . , N-2, N (where N is even) and s=2, 4, . . . , N-1, N (where N is odd) and the lower-order bits of the input address are N-s bits of the master counter. Referring again to FIG. 10, once the input address is generated by operation 104, the input buffer receives the input address and, with the exception of the last stage described below, the output buffer also receives the input address.

Figure 12:
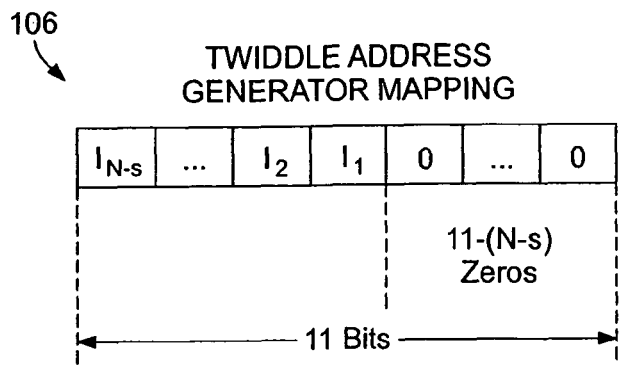
FIG. 12 is a diagram depicting an exemplary twiddle address mapping in accordance with an exemplary embodiment.

In an operation 106, Twiddle factor addresses are generated. FIG. 12 illustrates an exemplary mapping for the Twiddle address. This exemplary mapping involves a re-shuffling of the input address generated in operation 104. The Twiddle address has 11 bits. The higher-order bits are the input address bits (N-s) to 1. The remaining lower-order bits of the Twiddle factor address (which is determined by subtracting the input address size, 11, by N-s) are set to zero.

In order to determine whether new Twiddle factors are needed and for the purpose of saving power, a transition determination is made to limit the number of accesses to memory 38 (such as a ROM). A Twiddle address transition indicator is generated by operation 106 which indicates that there is a change or transition in the Twiddle address and that new Twiddle factors are needed. The Twiddle address transition indicator is sent to the storage registers 92 in the processing unit 18 and the mathematical functions memory 38. When the memory 38 is accessed, three Twiddle factors are retrieved, manipulated as described above, and stored in the storage registers 92.

The following describes the population of the storage registers 92 with Twiddle factors and use of the Twiddle factors. In this process, the two least significant bits (LSB) of the master counter are multiplied with the Twiddle address using a multiplier 110. The product of this multiplication (13 bits in this exemplary embodiment) is separated into parts. Ten of the bits are provided as inputs to a summer 112 and a multiplexer 114. The summer 112 performs a subtraction of the ten bits from 512 and provides the result to an input 1 of the multiplexer 114. The other input of the multiplexer 114 (input 0) receives the ten bits from the multiplication result from the multiplier 110. One bit from the remaining bits from the multiplication result is used as a select to the multiplexer 114 and the 3 highest-order bits of the multiplication result are provided as the previously referenced control word to the Twiddle octant manipulator 90 in processor 18. The output of the multiplexer 114 is the address sent to the mathematical functions memory 38 for retrieving a Twiddle factor.

Figure 13:
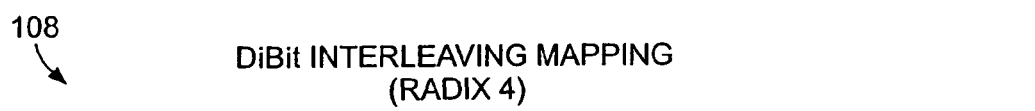
FIG. 13 is a diagram depicting interleaving mappings for a last stage process in accordance with an exemplary embodiment.
Figure 13:
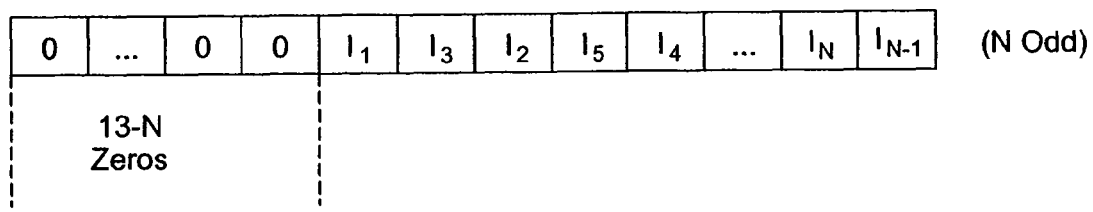

If the length of the input vector undergoing the FFT transform has a length which is odd power of 2 (non-integral multiple of 4), the output buffer receives an interleaved version of the input address formed in an operation 108. As illustrated in FIG. 13, the interleaving version of the input address depends on the value of N, which—as indicated above—represents log$_2$ (FFT size). The 13 bits of the address provided to the output buffer includes zeros in the first 13-N bits, followed by the arrangement of the input address shown in FIG. 13. By design, the processing carried out and illustrated in FIGS. 10-13 limits access to the memory 38 containing Twiddle factors, thereby saving power.

Figure 14:
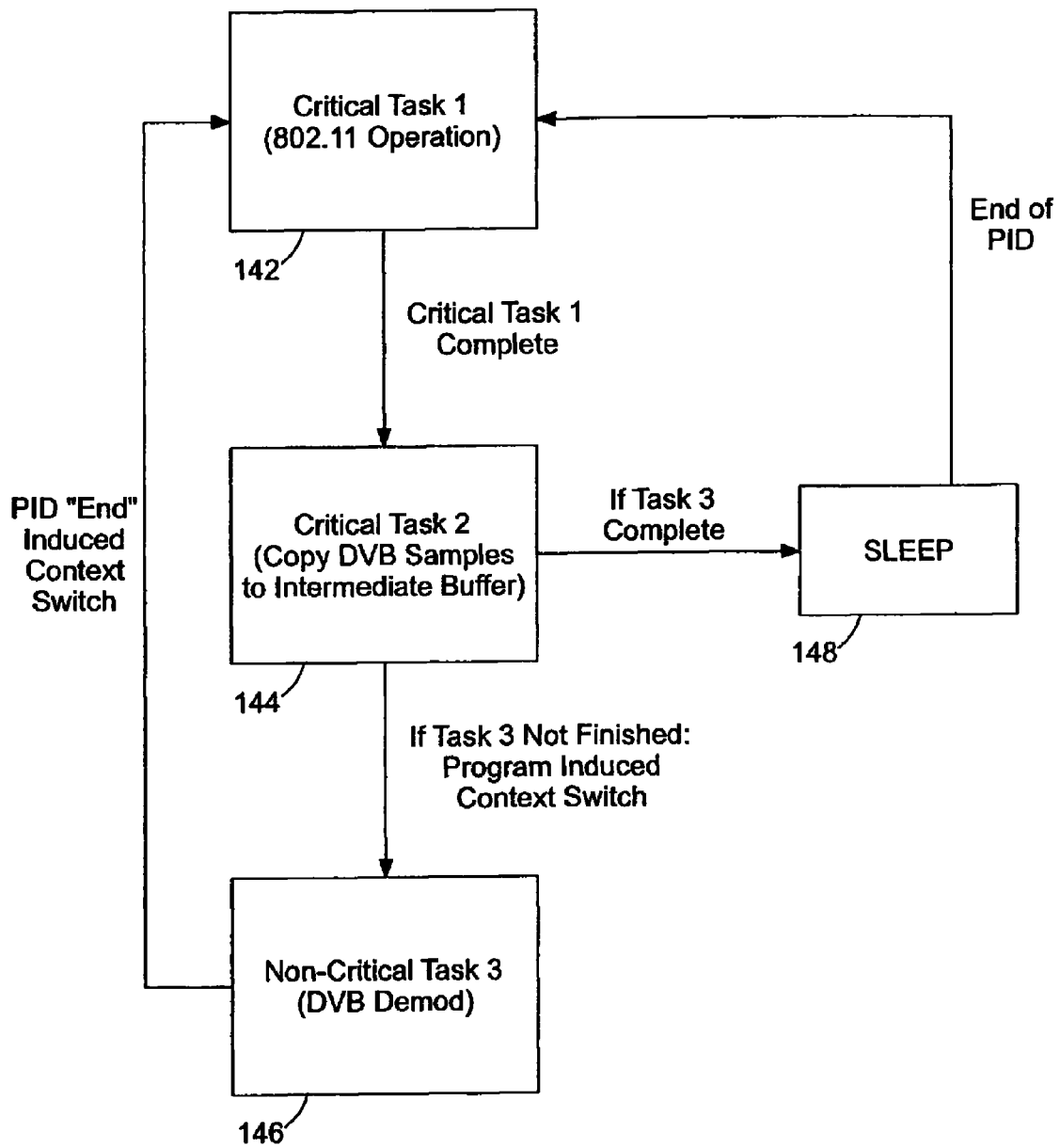
FIG. 14 is a diagram depicting a context switching operation in accordance with an exemplary embodiment.

FIG. 14 illustrates operations performed in a context switching process carried out in the wireless broadband signal processing system 10. Additional, fewer, or different operations may be performed depending on the embodiment or implementation. In an operation 142, a critical task 1 operation is performed. A critical task is one or more operations, each operation needing to be completed before a new processing iteration during (PID) begins. For example, critical task 1 can include 802.11 operations that are performed when a processing iteration duration (PID) instruction is received, each operation completing before a new PID is received. Once a critical task 1 operation is completed, a critical task 2 operation can be performed in an operation 144. For example, critical task 2 can be operations involved in copying DVB samples to an intermediate buffer. If a critical task 2 operation is completed before a non-critical task 3 is finished, a program induced context switch is performed in which a non-critical task operation is performed in operation 146. Non-critical operations may extend across PID boundaries. Such a non-critical task 3 can be a DVB demodulation. When a PID instruction is received, the induced context switch is ended. If the non-critical task is complete when critical task 2 is completed, a sleep mode is entered until the PID ends.

A conventional definition of context is a set of information from which a task may restart where it previously left off. During a context switch, the context of the "current" task is stored, and the context of the "next" task is loaded. The "current" task will be revisited at some future time by loading back in the previously stored context. The state of the WBSP is defined by a set of processor registers. In an illustrative example, a processor register is the Instruction Pointer, however there can be several additional processor registers. The WBSP incorporates sets of memory elements (e.g., hardware registers) for the complete description of a context. The number of sets of memory elements determines the maximum number of simultaneous contexts. In the WBSP, a context switch occurs when the information stored in a set of memory elements for a given context is loaded as the set of processor registers. In the WBSP, the entire set of memory elements is loaded into the processor registers in a single clock. At this point, the WBSP continues normal steady-state execution of instructions.

Figure 15:
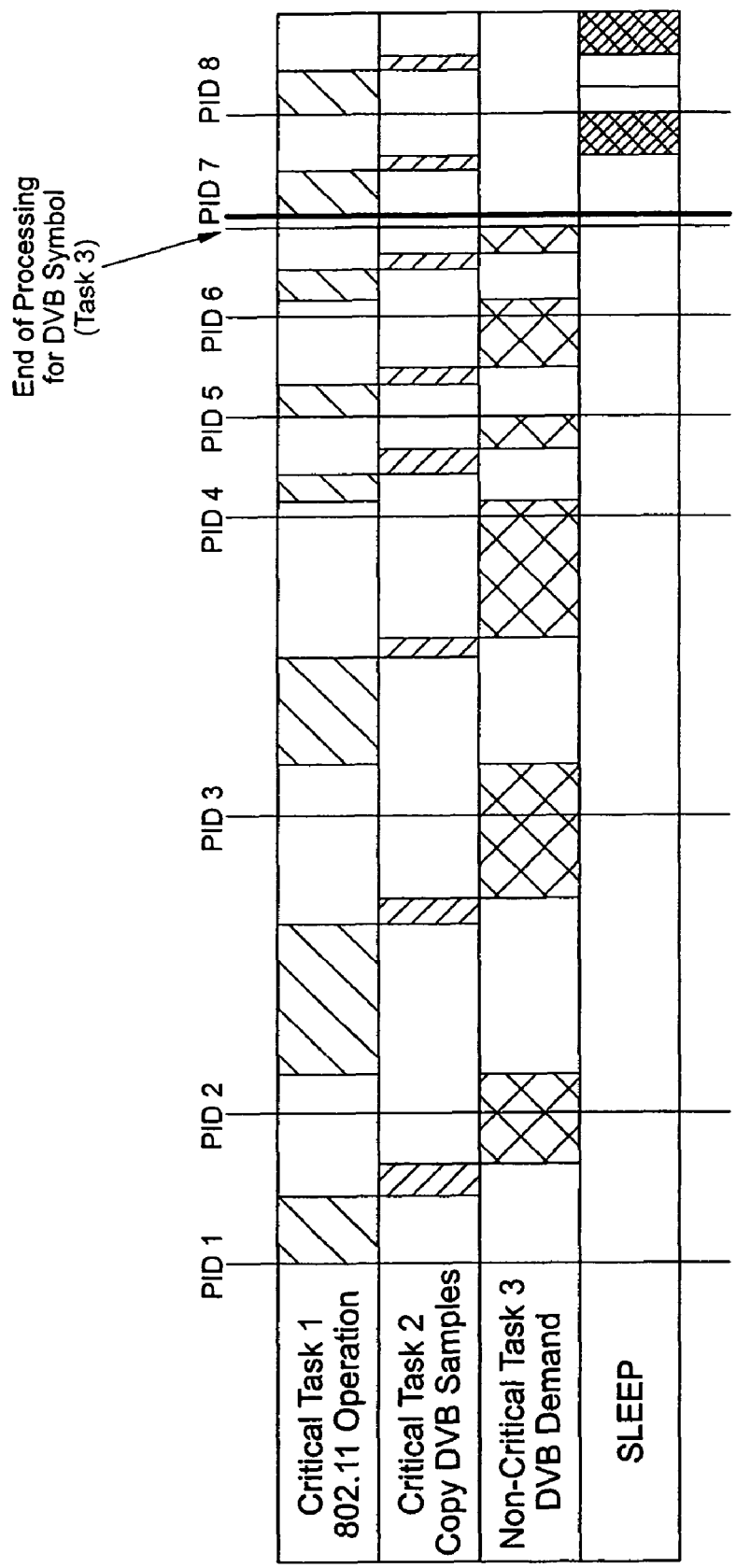
FIG. 15 is a diagram timing of the context switching operation of FIG. 14.

FIG. 15 depicts timing of the context switching process described with reference to FIG. 14. PID 1 initiates a critical task 1 operation. The critical task 1 operation is completed before PID 2 begins, allowing a critical task 2 operation and a non-critical task 3 operation to be performed. Upon receipt of PID 2, the non-critical task 3 is halted (although not completed yet) and critical task 1 operation is performed. Such a process continues where receipt of a PID triggers the execution of a critical task operation. The critical tasks operations are performed in order and if a new PID is not yet received, a non-critical task operation can be performed. As such, critical task operations are completed within the PID but inactive periods are utilized to execute non-critical tasks.

Figure 16:
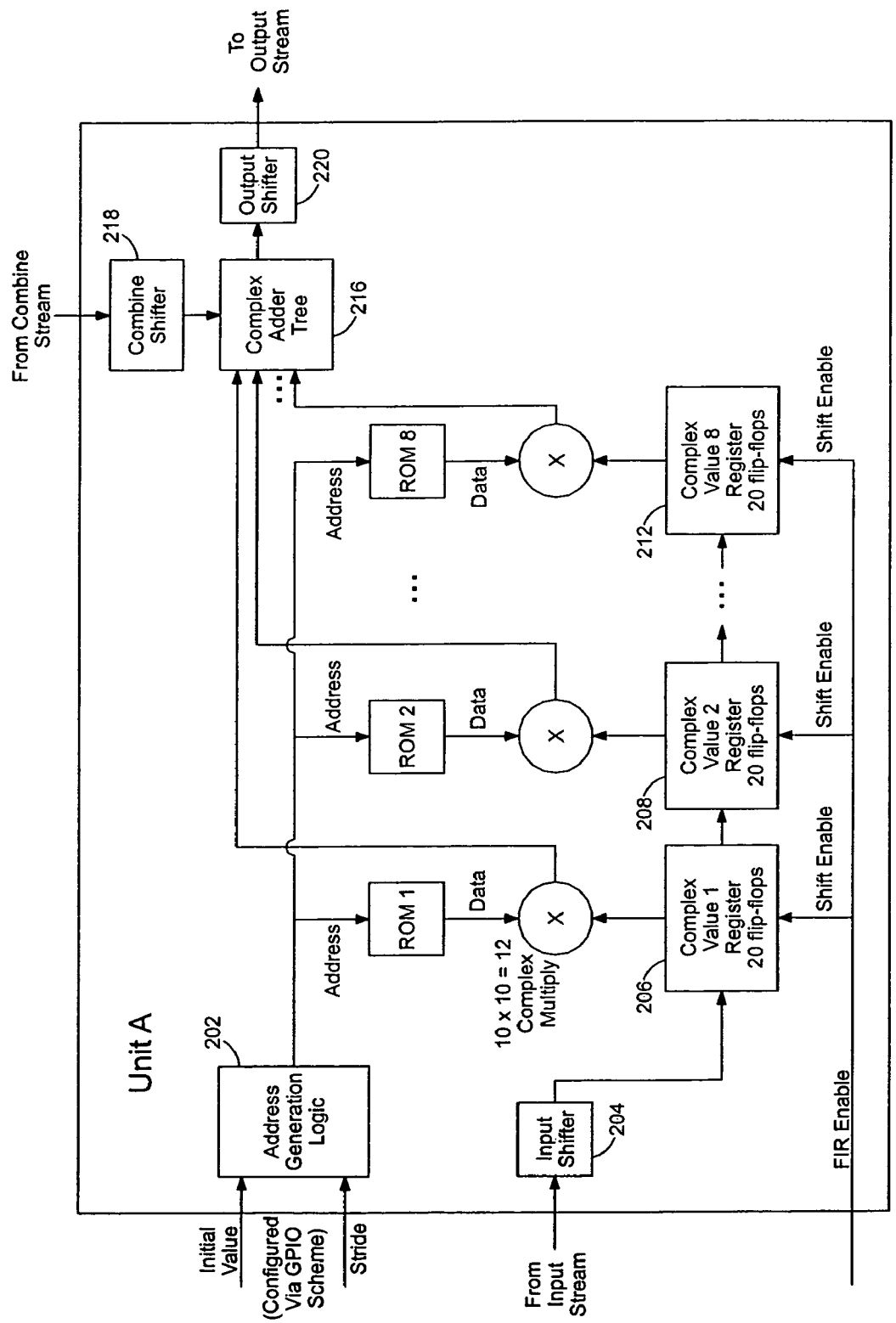
FIG. 16 illustrates a processing unit in the wireless broadband signal processing system of FIG. 1.

FIG. 16 illustrates a processing unit in the wireless broadband signal processing system 10. The processing unit can perform convolution operations (FIR filtering) and tap loading. An initial value and a stride value are provided to address generation logic 202. The address generation logic 202 generates addresses that are supplied to ROM 1, ROM 2, ROM 3, ROM 4, ROM 5, ROM 6, ROM 7 and ROM 8. Input data is received by the processing unit at an input shifter 204. The input shifter 204 performs the tap loading, loading the received data into registers 206, 208 and 212. The registers can be flip-flop structures.

Complex multiplication operations are carried out on data that has been loaded into the ROM structures at the locations corresponding to the addresses generated by the address generation logic 22 and the communication data. The products of these complex multiplication operations are summed by a complex adder tree 216. Multiplication beyond eight-fold parallel multiplication is allowed by a combine shifter 218 which feeds a combine stream into the complex tree adder 216. The convolution is thus built up by accumulating taps. The inclusion of the combine stream input into the complex tree adder 216 thus allows for dynamic range control. An output shifter 220 shifts data from the complex adder tree 216 as an output stream of data from the processing unit.

Figure 17:
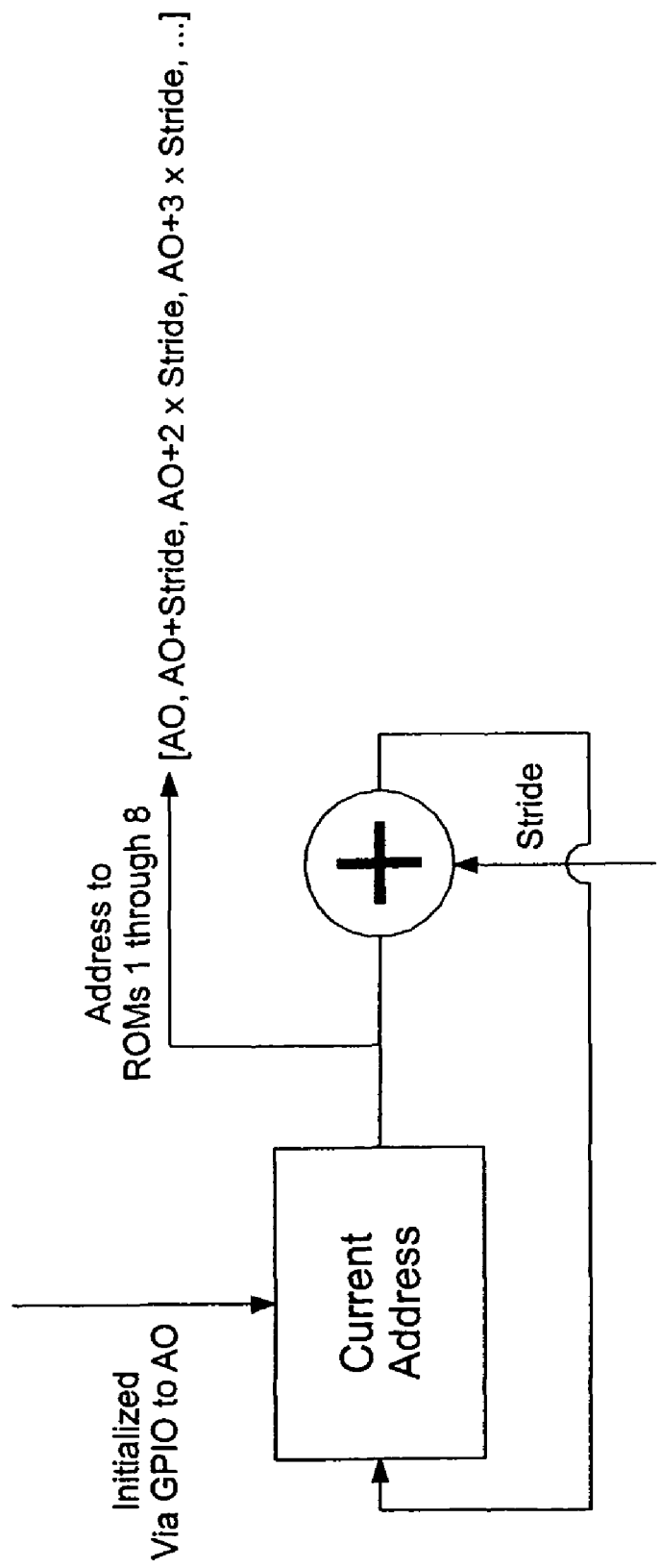
FIG. 17 illustrates address operation logic from the processing unit of FIG. 16.

FIG. 17 illustrates address operation logic 202 from the processing unit of FIG. 16 in greater detail. An initialized address is received by the address generation logic 202 via a GPIO instruction. This initialized address is a current address. Addresses communicated to the ROM memory structures (FIG. 16) are the current address (A0), the current address plus a stride value, the current address plus a stride value times two, etc. As data is read from the ROM structures, the current address is incremented by the stride value. As such, incrementing the address is done automatically without needing to re-load the "top" or the value that the communication data is summed over.

The contents of ROM 1, ROM 2, ROM 3, ROM 4, ROM 5, ROM 6, ROM 7 and ROM 8 in FIG. 16 can be determined using the formulas below:

$$R_{A,n} = \text{round}\left(\frac{\sin x}{x} \times 512\right)$$

$$x = \frac{\pi \times A}{256} + (n-4) \times \pi$$

where R is the contents of the n–th ROM at address A and A is the address defined for value 0 through 255.

While several embodiments of the invention have been described, it is to be understood that modifications and changes will occur to those skilled in the art to which the invention pertains. Accordingly, the claims appended to this specification are intended to define the invention precisely.

What is claimed is:

1. A method for switching between instruction contexts in a multi-mode wireless broadband processing system, the method comprising:
   receiving instructions at the multi-mode wireless broadband processing system, wherein each time interval comprises a duration between two received instructions;
   executing critical task operations in the multi-mode wireless broadband processing system, each critical task operation executing within a time interval;
   executing non-critical task operations in the multi-mode wireless broadband processing system, execution of each non-critical task operation being able to cross a time interval boundary, wherein non-critical task operations are not begun in a given time interval until execution of any critical task operations has completed for the given time interval; and
   for each time interval, entering a sleep mode in which no critical task operations or non-critical task operations are executed until a following time interval begins if any critical task operations and any non-critical task operations begun in the time interval have completed before the following time interval begins.

2. The method of claim 1, wherein at least one critical task operation is executed in its entirety within each time interval.

3. The method of claim 1, wherein a number of sets of hardware registers determines a maximum number of simultaneous contexts.

4. A system for switching between instruction contexts in a multi-mode wireless broadband processing system, the system comprising:
   a memory containing instructions, the instructions representing critical task operations and non-critical task operations; and
   a controller that receives and executes the instructions, the critical task operations being executed within a time interval, and execution of each non-critical task operation being able to cross time interval boundaries,
   wherein each time interval comprises a duration between two received instructions,
   wherein non-critical task operations are not begun in a given time interval until execution of any critical task operations has been completed for the given time interval, and
   wherein, for each time interval, a multi-mode wireless broadband processing system comprising the controller and the memory enters a sleep mode in which no critical task operations or non-critical task operations are executed until a following time interval begins if any critical task operations and any non-critical task operations begun in the time interval have completed before the following time interval begins.

5. The system of claim 4, wherein at least one critical task operation is executed in its entirety within each time interval.

6. The system of claim 4, wherein a number of sets of memory elements determines a maximum number of simultaneous contexts.

7. The system of claim 4, wherein the controller initiates a context switch in response to receipt of each instruction.

8. The system of claim 4, wherein a critical task operation comprises an 802.11 operation.

9. The system of claim 8, wherein a non-critical task operation comprises copying DVB samples to an intermediate buffer.

10. The system of claim 4, wherein a non-critical task operation comprises copying DVB samples to an intermediate buffer.

11. The method of claim 1, further comprising:
   initiating a context switch in response to receipt of each instruction.

12. The method of claim 1, wherein a critical task operation comprises an 802.11 operation.

13. The method of claim 12, wherein a non-critical task operation comprises copying DVB samples to an intermediate buffer.

14. The method of claim 1, wherein a non-critical task operation comprises copying DVB samples to an intermediate buffer.

* * * * *